United States Patent
Slack et al.

[11] Patent Number: 6,063,891
[45] Date of Patent: May 16, 2000

[54] FREEZE STABLE ALLOPHANATE-MODIFIED TOLUENE DIISOCYANATE TRIMERS

[75] Inventors: William E. Slack, Moundsville; Hersel T. Kemp, II, Martinsville, both of W. Va.

[73] Assignee: Bayer Corporation, Pittsburgh, Pa.

[21] Appl. No.: 09/375,842

[22] Filed: Aug. 16, 1999

Related U.S. Application Data

[62] Division of application No. 09/001,843, Dec. 31, 1997.

[51] Int. Cl.$^7$ .................................................. C08G 18/10
[52] U.S. Cl. ................................ 528/59; 528/49; 528/67; 528/76; 528/77; 528/83; 528/73; 528/48; 252/182.2; 252/182.21; 252/182.22; 252/182.23; 252/182.24; 252/182.25
[58] Field of Search ................................ 528/44, 52, 49, 528/67, 59, 76, 77, 83, 73, 48; 252/182.2, 182.21, 182.22, 182.23, 182.24, 182.25

[56] References Cited

U.S. PATENT DOCUMENTS

| | | | |
|---|---|---|---|
| 3,954,684 | 5/1976 | Farrissey, Jr. et al. | 260/2.5 AW |
| 4,284,730 | 8/1981 | Narayan et al. | 521/160 |
| 4,379,905 | 4/1983 | Stemmler et al. | 58/73 |
| 4,382,125 | 5/1983 | Narayan et al. | 521/160 |
| 4,456,709 | 6/1984 | Richter et al. | 521/160 |
| 4,487,928 | 12/1984 | Richter et al. | 544/193 |
| 4,518,761 | 5/1985 | Richter et al. | 528/67 |
| 4,540,781 | 9/1985 | Barsa | 544/193 |
| 4,604,481 | 8/1986 | Karn et al. | 560/39 |
| 4,632,785 | 12/1986 | Barsa | 260/501.15 |
| 4,743,627 | 5/1988 | Narayan et al. | 521/160 |
| 4,837,321 | 6/1989 | Kerimis et al. | 544/193 |
| 5,064,960 | 11/1991 | Pedain et al. | 544/222 |
| 5,124,370 | 6/1992 | Scholl et al. | 521/161 |
| 5,124,427 | 6/1992 | Potter et al. | 528/67 |
| 5,208,334 | 5/1993 | Potter et al. | 544/193 |
| 5,235,018 | 8/1993 | Potter et al. | 528/49 |
| 5,258,482 | 11/1993 | Jacobs et al. | 528/49 |
| 5,260,334 | 11/1993 | Ashida et al. | 521/131 |
| 5,260,344 | 11/1993 | Ashida et al. | 521/131 |
| 5,444,146 | 8/1995 | Potter et al. | 528/49 |
| 5,541,281 | 7/1996 | Yeske et al. | 528/70 |
| 5,576,411 | 11/1996 | Yeske et al. | 528/70 |
| 5,606,004 | 2/1997 | Brahm et al. | 528/73 |
| 5,723,564 | 3/1998 | Schmalstieg et al. | 528/73 |
| 5,798,431 | 8/1998 | Brahm et al. | 528/73 |
| 5,849,944 | 12/1998 | Allen et al. | 560/26 |
| 5,894,944 | 12/1998 | Allen et al. | 560/26 |

FOREIGN PATENT DOCUMENTS

| | | |
|---|---|---|
| 2113890 | 8/1994 | Canada . |
| 1520846 | 8/1978 | United Kingdom . |

*Primary Examiner*—James J. Seidleck
*Assistant Examiner*—Sanza L. McClendon
*Attorney, Agent, or Firm*—Joseph C. Gil; N. Denise Brown

[57] ABSTRACT

This invention relates to a novel freeze-stable allophanate modified toluene diisocyanurates, and to a process for producing these freeze-stable allophanate-modified toluene diisocyanurates which requires a catalyst which is capable of forming both trimer and allophanate groups, or a catalyst system comprising at least one catalyst capable of forming trimer groups and at least one catalyst capable of forming allophanate groups. This invention also relates to novel freeze-stable blends of the allophanate-modified toluene diisocyanurates with di- and/or polyisocyanates of the diphenylmethane series; and to freeze-stable urethane prepolymers of the allophanate-modified toluene diisocyanurates, or the blends of these with an isocyanate of the diphenylmethane series.

14 Claims, No Drawings

FREEZE STABLE ALLOPHANATE-MODIFIED TOLUENE DIISOCYANATE TRIMERS

RELATED APPLICATIONS

This application is a divisional of U.S. application Ser. No. 09/001,843 filed in the United States Patent and Trademark Office on Dec. 31, 1997.

BACKGROUND OF THE INVENTION

This invention relates to a freeze-stable, allophanate-modified toluene diisocyanurate having an NCO group content of from about 15 to about 42%. These freeze-stable compositions are prepared by reacting toluene diisocyanate and a specific amount of an organic compound which has at least one hydroxyl group in the presence of an allophanate-trimer catalyst or an allophanate-trimer catalyst system.

The trimerization of aromatic isocyanates to form polyisocyanurates is well known in the art. U.S. Pat. Nos. 4,743,627 and 4,382,125 both describe the partial trimerization of polymethylene polyphenylene polyisocyanate (p-MDI), having an average functionality of >2.2, to give stable liquid products having relatively high viscosity at 25° C. (i.e., 2000–100,000 mPa·s).

U.S. Pat. No. 4,284,730 relates to the trimerization of monomeric MDI which has been partially converted to carbodiimide/uretonimine, to give stable liquid polyisocyanurate compositions.

U.S. Pat. No. 5,124,370 describes liquid polyisocyanate mixtures containing isocyanurate groups and having an NCO content of 15 to 30% by weight. These mixtures are obtained by partial trimerization of the isocyanate groups of polyisocyanate mixtures of the diphenylmethane series containing 80 to 100% by weight diisocyanate diphenylmethane isomers and 0 to 20% by weight higher ring compounds of the diisocyanate diphenylmethane series.

The trimerization of toluene diisocyanate in a solvent to make a storage stable liquid is described in both U.S. Pat. No. 4,379,905 and DE 19,523,657. These products are disclosed as being suitable as isocyanate components in two-component polyurethane lacquers.

U.S. Pat. No. 4,456,709 describes storage-stable liquid polyisocyanates which have an NCO group content of 36.5 to 45%. These are prepared by mixing 25 to 70 parts of partially trimerized 2,4-TDI with 75 to 30 parts of unmodified 2,4- and/or 2,6-TDI.

Canadian Patent Application 2,113,890 relates to trimer catalyst systems for aliphatic and aromatic isocyanates. The trimer catalyst systems of this earlier application comprise (A) a lithium compound selected from the group consisting of: (i) lithium salts of aliphatic or aromatic monocarboxylic or dicarboxylic acids, (ii) lithium salts of hydroxyl group containing compounds having from 1 to 3 hydroxyl groups per compound, wherein the hydroxyl groups are directly attached to an aromatic ring, and (iii) lithium hydroxide; and (B) an organic compound containing at least one hydroxyl groups. These trimer catalyst systems result in partially trimerized isocyanates which additionally can contain a significant amount of urethane groups.

In accordance with the disclosures of U.S. Pat. No. 4,379,905 and DE 19,523,657, it is necessary that a solvent be present in order to form liquid products. Due to the large quantity of solvent present, these products have restricted uses. In particular, these products are clearly designed for use in coatings applications only.

U.S. Pat. No. 4,456,709 requires pure 2,4-toluene diisocyanate in the first step. The process in this reference results in final products having a relatively narrow NCO content and a restricted distribution of oligomers due to the fact that the trimerization must be completed in the first step of the process.

Advantages of the presently claimed invention include the fact that one is able to use any TDI isomer mixture to obtain freeze-stable products over a broad NCO range. This invention also provides the ability to blend the allophanate-modified TDI trimer products with MDI based isocyanates to obtain freeze-stable products. It is also within the scope of the present invention to prepare freeze-stable polyether and polyester prepolymers from the allophanate-modified TDI trimer products. Until now, it has not been possible to form TDI based trimer products over such a broad range of NCO contents which are freeze-stable over a long period of time. In addition, the use of solvent is not necessary to make the freeze-stable liquid allophanate-modified toluene diisocyanurates of the present invention. In fact, it is preferred that solvents are not used in the present invention.

DESCRIPTION OF THE INVENTION

The present invention relates to freeze-stable allophanate-modified toluene diisocyanurates having an NCO group content of from 15 to 42%, preferably of from 25 to 35%. These freeze-stable allophanate-modified toluene diisocyanurates comprise the reaction product of:

A) toluene diisocyanate and

B) an organic compound containing at least one hydroxyl group, in the presence of a catalytic amount of C) at least one allophanate-trimer catalyst, or an allophanate-trimer catalyst system, wherein component B) is present in a quantity such that there are from about 0.015 to about 0.2 equivalent (preferably about 0.05 to about 0.15 equivalent) hydroxyl groups per equivalent of isocyanate of the toluene diisocyanate present, and at least about 50% of the equivalents of the urethane groups are converted to allophanate groups by the catalyst or the catalyst system.

A suitable catalyst stopper is preferably added to the above reaction mixture to neutralize the catalyst in the mixture, once the desired NCO group content is reached. The amount of catalyst stopper added is such that there are 2 equivalents of stopper to each mole of catalyst.

Another embodiment of the present invention relates to freeze-stable blends which have an NCO group content of from about 16.8 to about 41.6%. These freeze-stable blends are prepared by blending:

(I) 50 to 95% by weight, based on 100% by weight of (I) and (II), of an allophanate-modified toluene diisocyanurate, and (II) 5 to 50% by weight, based on 100% by weight of (I) and (II), of a polyisocyanate comprising:

(a) from 0 to 60% by weight of 2,4-diphenylmethane diisocyanate, (b) no more than 6% by weight of 2,2'-diphenylmethane diisocyanate, (c) from 30 to 100% by weight of 4,4'-diphenylmethane diisocyanate, and (d) from 0 to 60% by weight of higher functional isocyanates of the diphenylmethane series, with the %'s by weight of (II)(a), (II)(b), (II)(c) and (II)(d) totaling 100% by weight.

In this embodiment, the allophanate-modified toluene diisocyanurate may be freeze-stable as described hereinabove. It is not, however, necessary that the allophanate-modified toluene diisocyanurate be freeze-stable to be used to form a freeze-stable blend with (II) a polyisocyanate as described above.

Another aspect of the present invention relates to freeze-stable, urethane prepolymers of allophanate-modified toluene diisocyanurate having an NCO group content of from about 14 to about 40%, preferably from about 20 to about 35%. These urethane prepolymers are the reaction product of:

(I) a freeze-stable allophanate-modified toluene diisocyanurate as describe hereinabove, or a freeze-stable blend of an allophanate modified toluene diisocyanurate with polymethylene poly(phenyl isocyanate) as described hereinabove, and (III) an isocyanate-reactive component containing from about 1.5 to about 4 hydroxyl groups and having a molecular weight of from about 76 to about 10,000.

In this particular embodiment, suitable isocyanate-reactive components (III) preferably include (a) polyether polyols having molecular weights of from about 100 to about 10,000 (preferably 400 to 6,000), and hydroxyl functionalities of from about 1.5 to about 4 (preferably 2 to 3); and (b) polyester polyols having molecular weights of from about 200 to about 3,000 (preferably 500 to 2,000), and hydroxyl functionalities of from about 1.8 to about 3 (preferably 2).

This invention also relates to a process for preparing these novel compositions of freeze-stable, allophanate-modified toluene diisocyanurates; a process for preparing these novel compositions of freeze-stable blends of allophanate-modified toluene diisocyanurates with a di- or polyisocyanate of the MDI series; and a process for preparing these novel compositions of freeze-stable, urethane prepolymers of these novel compositions.

The process for the preparation of a freeze-stable allophanate-modified toluene diisocyanurate comprises:

1) heating A) toluene diisocyanate and B) at least one organic compound which contains at least one hydroxyl group to a temperature of from about 50 to about 200° C., preferably from about 80 to about 120° C., for a time period of from about 1 to about 500 minutes, preferably from about 20 to about 240 minutes, in the presence of a catalytic amount of C) at least one allophanate-trimer catalyst, or an allophanate-trimer catalyst system;

wherein component B) is present in a quantity such that there are from about 0.015 to about 0.20 (preferably about 0.05 to about 0.15) equivalent hydroxyl groups per equivalent of isocyanate of the toluene diisocyanate present, and at least about 50% of the equivalents of the urethane groups are converted to allophanate groups by the catalyst or the catalyst system;

and 2) after the desired NCO group content of the reaction mixture in 1) is reached, adding a catalyst stopper in an amount such that there are 2 equivalents of catalyst stopper for each mole of catalyst, to neutralize the catalyst in the reaction mixture.

The process for the preparation of the freeze-stable blend of an allophanate modified toluene diisocyanurate with a polyisocyanate comprises 1) heating A) toluene diisocyanate and B) at least one organic compound which contains at least one hydroxyl group to a temperature of from about 50 to about 200° C., preferably from about 80 to about 120° C., for a time period of from about 1 to about 500 minutes, preferably from about 20 to about 240 minutes, in the presence of a catalytic amount of C) at least one allophanate-trimer catalyst, or an allophanate-trimer catalyst system;

wherein component B) is present in a quantity such that there are from about 0.015 to about 0.20 (preferably about 0.05 to about 0.15) equivalent hydroxyl groups per equivalent of isocyanate of the toluene diisocyanate present, and at least about 50% of the equivalents of the urethane groups are converted to allophanate groups by the catalyst or the catalyst system;

and 2) blending the mixture from 1) with (II) a polymethylene poly(phenylisocyanate) as described above, at a temperature of from 20 to 120° C., preferably 20 to 40° C.

In addition, once the desired NCO group content of the mixture in 1) is reached, a catalyst stopper may optionally be added to neutralize the catalyst present in reaction mixture. Generally, catalyst stopper is added in an amount such that there are 2 equivalents of catalyst stopper for each mole of catalyst. It is typically preferred to add a catalyst stopper when the isocyanate in step 2) contains little to no polymethylene poly(phenyl isocyanate), i.e. higher functional isocyanates of the diphenylmethane series.

The reaction mixture formed in step 1) of the above process may be freeze-stable. It is not, however, necessary that the reaction mixture formed in step 1) be freeze-stable in order to form a freeze-stable blend with polymethylene poly(phenylisocyanate).

The process for the preparation of the freeze-stable urethane prepolymers of a freeze-stable allophanate-modified toluene diisocyanurate, or a freeze-stable blend of an allophanate-modified toluene diisocyanurate with a polymethylene poly(phenyl isocyanate), comprises 1) heating A) toluene diisocyanate and B) at least one organic compound which contains at least one hydroxyl group to a temperature of from about 50 to about 200° C., preferably from about 80 to about 120° C., for a time period of from about 1 to about 500 minutes, preferably from about 20 to about 240 minutes, in the presence of a catalytic amount of C) at least one allophanate-trimer catalyst or an allophanate-trimer catalyst system;

wherein component B) is present in a quantity such that there are from about 0.015 to about 0.20 (preferably about 0.05 to about 0.15) equivalent hydroxyl groups per equivalent of isocyanate of the toluene diisocyanate present, and at least about 50% of the equivalents of the urethane groups are converted to allophanate groups by the catalyst or the catalyst system;

2) adding a catalyst stopper, after the desired NCO group content of the reaction mixture in 1) is reached, preferably in an amount such that there are 2 equivalents of catalyst stopper for each mole of catalyst, to neutralize the catalyst in the reaction mixture;

optionally, 3) blending the reaction mixture from 1) or the neutralized mixture from 2) with (II) a polymethylene poly (phenylisocyanate) at a temperature of from 20 to 120° C., preferably 20 to 40° C., to form a freeze-stable blend;

and 4) reacting the neutralized freeze-stable reaction mixture (i.e., the allophanate modified toluene diisocyanurate)

from step 2) or the freeze-stable blend (i.e., a blend of allophanate-modified toluene diisocyanurate with polymethylene poly(phenyl isocyanate) from step 3), with (III) an isocyanate-reactive component containing from about 1.5 to about 4 hydroxyl groups and having a molecular weight of from about 76 to about 10,000, at temperatures between 40 and 120° C., preferably between 50 and 70° C., for a time of from 0.5 to 4 hours, preferably of from 1 to 3 hours.

In the embodiment of the above process where the freeze-stable urethane prepolymer of the allophanate-modified toluene diisocyanurate is formed, the neutralized reaction mixture formed in step 2) above should be freeze-stable. In addition, it is possible to blend the resultant freeze-stable urethane prepolymers of freeze-stable allophanate-modified toluene diisocyanate, with (II) a polymethylene poly(phenylisocyanate) at a temperature of from 20 to 120° C., preferably 20 to 40° C.

In the embodiment of the above process where the freeze-stable urethane prepolymer of the freeze-stable blend from step 3) is formed, it is not necessary that the allophanate-modified toluene diisocyanurate formed in step 1) or in step 2) be freeze-stable.

Organic compounds containing at least one hydroxyl group B) are necessary according to the present process. Suitable compounds include those compounds having a molecular weight in the range of from 32 to about 6,000 and containing from 1 to 4 hydroxyl groups.

It is preferred that these organic compounds containing at least one hydroxyl group are lower molecular weight organic compounds containing from 1 to 4, more preferably 1 to 2 hydroxyl groups, and having a molecular weight range of from 32 to about 400. Suitable organic compounds include, for example, methanol, 1-ethanol, 1,2-ethanediol, 1-propanol, 2-propanol, 1-butanol, isobutyl alcohol, 2-butanol, n-amyl alcohol, sec-amyl alcohol, tert-amyl alcohol, 1-ethyl-1-propanol, n-hexanol and isomers thereof, n-octyl alcohol, 2-octyl alcohol, 2-ethyl-1-hexanol, n-decyl alcohol, n-dodecyl alcohol, neopentylglycol, n-tetradecyl alcohol, n-hexadecyl alcohol, n-octadecyl alcohol, 1,3-propanediol, 1,4-butanediol, 1,3-butanediol, 2,3-butanediol, 3-methyl-2-butanol, 3,3-dimethyl-1-butanol, 2-ethyl-1,3-hexanediol, glycerol, 1,2,4-butanetriol, pentaerythritol, diethylene glycol, dipropylene glycol, diethylene glycol, triethylene glycol, etc. It is more preferred for these organic compounds to contain from 1 to 2 hydroxyl groups, such as a monoalcohol or a diol, and have a molecular weight of from 60 to about 200. Examples include 1-propanol, 2-propanol, 1-butanol, 2-butanol, n-amyl alcohol, 1-methylbutyl alcohol, 1-ethyl-1-propanol, n-octyl alcohol, 2-octyl alcohol, 2-ethyl-1-hexanol, neopentyl-glycol, 1,2-propanediol, 1,3-propanediol, 1,4-butanediol, 1,3-butanediol, 2,3-butanediol, 2-ethyl-1,3-hexanediol, diethylene glycol, triethylene glycol, dipropylene glycol, tripropylene glycol, etc. Preferred compounds are isomeric alcohols having between 2 and 16 carbon atoms such as, for example, the isomeric butanols, and the isomeric propanols. Most preferred are 2-propanol and isobutyl alcohol.

In addition to the lower molecular weight organic compounds containing at least one hydroxyl group identified above, higher molecular weight adducts of these low molecular weight compounds are also suitable to be used as component B) of the present invention. These relatively high molecular weight polyether polyols include those conventionally used in polyurethane chemistry, and can be prepared by the epoxidation of a low molecular weight organic compound in the presence of a suitable catalyst to yield a higher molecular weight adduct. Suitable polyether polyols typically have molecular weights in the range of from greater than 400 to about 6,000, preferably about 500 to about 3,000, more preferably about 500 to about 2,000. It is preferred that these polyether polyols have a functionality of 1 to 3.

Suitable polyethers are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4-butanediol, trimethylolpropane, 4,4'-dihydroxydiphenylpropane, aniline, glycerine, ammonia and ethanolamine. Polyethers that contain predominantly primary hydroxyl groups (up to about 90% by weight, based on all of the hydroxyl groups in the polyether) are also often preferred. Also suitable are polybutadienes containing hydroxyl groups, and polyalkylene polyethers, such as polyoxyethylene diol, polyoxypropylene diol, polyoxybutylene diol, and polytetramethylene diol.

It is, of course, also possible to use a mixture of one or more of the relatively high molecular weight organic compounds containing at least one hydroxyl group, with one or more of the relatively low molecular weight organic compounds containing at least one hydroxyl group.

In accordance with the present invention, B) the organic compound containing at least one hydroxyl group is typically present in a quantity such that there are from about 0.015 to about 0.2, more preferably 0.05 to 0.15 equivalent hydroxyl group per equivalent of toluene diisocyanate A) present. Also, it is necessary that at least about 50%, preferably at least about 70%, more preferably at least about 85% of the equivalents of the hydroxyl groups present in the organic compound which contains hydroxyl groups are converted from urethane groups to allophanate groups in the final product. Most preferably, at least about 95% of the equivalents of the hydroxyl groups present in the organic compound which contains hydroxyl groups are converted from urethane groups to allophanate groups.

It has also been found that certain TDI products are not freeze-stable liquids when from about 0.006 to about 0.2, preferably from about 0.02 to about 0.10 equivalent hydroxyl group of the organic compound containing at least one hydroxyl group, i.e., component B), of the above-identified system used in the present invention. These products (and processes for preparing them) are not, however, the subject of the present invention. Rather, these products which are not freeze-stable liquids and the processes for preparing these products which are not freeze-stable are the subject of Applicants' copending application, application Ser. No. 09/002,308, which was filed in the United States Patent and Trademark Office on the same day as the present application, Dec. 21, 1997. This copending application, which is commonly assigned, also describes and claims an allophanate-trimer catalyst system. This catalyst system is not the subject of the present application.

Suitable di- and polyisocyanates (II) to be blended with the allophanate modified toluene diisocyanurates include those of the polymethyl poly(phenyl isocyanate) series having NCO group contents of from 29.0 to 33.6%. Such di- and polyisocyanates (II) comprise (II)(a) from 0 to 60% by weight of 2,4-diphenylmethane diisocyanate, (II)(b) no more than 6% by weight of 2,2'-diphenylmethane diisocyanate, (II)(c) from 30 to 100% by weight of 4,4'-diphenylmethane diisocyanate, and (II)(d) from 0 to 60% by weight of higher functional isocyanates of the diphenylmethane series, with the %'s by weight of (II)(a), (II)(b), (II)(c) and (II)(d) totaling 100% by weight. Some examples of preferred isocyanates include isomeric mixtures of diphenylmethane diisocyanate containing from about 0 to 3% of the 2,4'-isomer and from about 97 to 100% of the 4,4'-isomer (with the %'s by weight of the isomers totalling 100%); isomeric mixtures of diphenylmethane diisocyanate containing from about 0 to 3% of the 2,2'-isomer, from about 40 to 60% of the 2,4'-isomer and from about 40 to 60% of the 4,4'-isomer (with the %'s by weight of the isomers totalling 100%); and polymethylene poly(phenyl isocyanates) having an NCO group content of from about 31 to about 33% and a functionality of from about 2.1 to about 2.8, and comprising from about 42 to about 78% of diphenylmethane diisocyanate, which consists of about 0 to about 3% of the 2,2'-isomer, about 1 to about 20% of the 2,4'-isomer and about 35 to about 55% of the 4,4'-isomer, and about 22 to about 58% by weight of higher homologs of the diphenylmethane diisocyanate series (with the %'s by weight of (II)(a), (II)(b), (II)(c) and (II)(d) totalling 100%).

Suitable isocyanate-reactive compounds (III) for the present application wherein urethane prepolymers of the freeze-stable allophanate modified toluene diisocyanurates are prepared by reacting the trimers with, for example, one or more compounds containing from about 1.5 to about 4 hydroxyl groups capable of reacting with NCO groups, and having molecular weights of from about 76 up to about 10,000. Such compounds include, for example, polyether polyols, polyester polyols, and diols.

Polyether polyols suitable as isocyanate-reactive compounds (III) for this aspect of the present invention include those having hydroxyl functionalities of about 1.5 to about 4, preferably from about 2 to about 3, and molecular weights of about 100 to about 10,000, preferably from about 400 to about 6,000, to yield a urethane prepolymer having an NCO content of from about 14 to about 40%, preferably about 20 to about 35%. Suitable polyester polyols suitable as isocyanate-reactive compounds (III) for this aspect of the present invention include those having hydroxyl functionalities of about 1.8 to about 2, preferably about 2, and molecular weights of about 200 to about 3,000, preferably from about 500 to about 2,000, to yield a urethane prepolymer having an NCO content of from about 14 to about 40%, preferably about 20 to about 35%.

Suitable diols to be used as isocyanate-reactive compounds (III) for forming urethane prepolymers of the freeze-stable allophanate modified toluene diisocyanurates, or blends of these with di- and/or polyisocyanates of the diphenylmethane diisocyanate series include, for example, 1,3-butanediol, propylene glycol, 2,2,4-trimethyl-1,3-pentanediol, 2-methyl-1,3-propanediol, dipropylene glycol, tripropylene glycol, diethylene glycol and triethylene glycol. Preferred diols are 1,3-butanediol, propylene glycol, dipropylene glycol and tripropylene glycol.

In accordance with the present invention, a catalyst is required to form freeze-stable products based on allophanate-modified toluene diisocyanurate. Suitable catalysts include allophanate-trimer catalysts or allophanate-trimer catalyst systems. Systems typically comprise at least one trimer catalyst and at least one allophanate catalyst. In situations where a higher conversion of the urethane groups to allophanate groups is desirable, an allophanate catalyst can be used in conjunction with the trimer catalyst as a catalyst system. Suitable allophanate-trimer catalysts and suitable allophanate-trimer catalyst systems are described below.

Suitable allophanate-trimer catalysts C) for the present invention include, for example, any of the known trimerization catalysts which convert at least about 50%, preferably at least about 70%, more preferably at least about 85% and most preferably at least about 95% of the equivalents of the urethane groups formed to allophanate groups. Some examples of trimer catalysts which form both trimer groups and allophanate groups include Mannich bases such as, for example, 2,4,6-bis(dimethylaminomethyl)phenol; metal salts of carboxylic acids such as, for example, lead octanoate and potassium acetate; and tertiary amines such as, for example, triethylene-diamine.

Suitable examples of catalyst systems C) for the present invention include those systems which comprise (a) at least one catalyst capable of forming trimer groups, and (b) at least one catalyst capable of forming allophanate groups. Such trimer catalysts and allophanate catalysts are known by those of ordinary skill in the art. In accordance with the present invention, suitable catalyst systems are those which convert at least 50%, preferably at least about 70%, more preferably at least about 85% and most preferably at least about 95% of equivalents of the urethane groups to allophanate groups.

A preferred allophanate-trimer catalyst system for the present invention comprises
  (a) at least one trimer catalyst selected from the group consisting of:
    (i) lithium salts of aliphatic or aromatic monocarboxylic acids or dicarboxylic acids,
    (ii) lithium salts of hydroxyl group containing compounds containing from 1 to 3 hydroxyl groups per compound, wherein the hydroxyl groups are attached directly to an aromatic ring,
    (iii) lithium hydroxide,
    and
    (iv) mixtures thereof;
  and
  (b) at least one allophanate catalyst.

Suitable lithium compounds, C)(a)(i), for use in the present invention include, for example, both the monolithium and dilithium salts of aliphatic and aromatic carboxylic acids containing a total of from about 1 to 36 carbon atoms. Both the mono- or dicarboxylic acids are suitable for the process according to the invention. Examples of these lithium compounds include lithium formate, lithium salicylate, lithium acetate, lithium stearate, lithium propanate, lithium butyrate, lithium lactate, lithium laurate, lithium benzoate, lithium p-hydroxybenzoate, lithium 4-hydroxy-phenylacetate, monolithium salt of oxalic acid, dilithium salt of oxalic acid, monolithium salt of glutaric acid, dilithium salt of glutaric acid, monolithium salt of isophthalic acid, dilithium salt of isophthalic acid, monolithium salt of phthalic acid, dilithium salt of phthalic acid, monolithium salt of terephthalic acid, and dilithium salt of terephthalic acid. Of these salts, lithium salicylate, lithium acetate, and lithium stearate are preferred.

The lithium compound may also be, for example, C)(a)(ii) the lithium salt of a hydroxy group containing compound wherein the hydroxyl groups are directly attached to an aromatic ring. These compounds may contain from 1 to 3 hydroxyl groups each, and the aromatic ring system contains a total of from 6 to 18 carbon atoms. The aromatic ring system may be a single ring such as, for example, phenyl, or a polynuclear aromatic system such as, for example, naphthalene. Suitable compounds include, for example, lithium phenoxide, 4-methyl lithium phenoxide, 2-hydroxy lithium phenoxide, 3-hydroxy lithium phenoxide, 4-hydroxy lithium phenoxide, lithium 1-naphthoxide, lithium 2-naphthoxide, etc. Lithium salts of cresols are also suitable trimerization catalysts. Theoretically, the lithium salts of substituted aromatic compounds are suitable provided the substituents do not deactivate the ring so that it is no longer an effective trimerization catalyst.

Lithium hydroxide is suitable for use as component C)(a)(iii) in the present invention.

Lithium salts of mono- and di-carboxylic acids, component C)(a)(i), are readily obtained using standard preparative methods well known to one skilled in the art. Equation (1) represents a general preparative method.

$$R_1COOH + LiA \rightarrow R_1COO^-Li^+ + AH \qquad (1)$$

wherein:

$R_1$ represents hydrogen or an aliphatic hydrocarbon chain having from 1 to 35 carbon atoms, or an aromatic ring system having from 6 to 18 carbon atoms, and A represents an anion such as hydroxyl, hydride, alkoxide, etc.

The reactant LiA is used in an amount which is slightly less than molar equivalency, thereby ensuring that no residual reactant will remain in the products.

The lithium salts of hydroxyl group containing compounds wherein the hydroxyl groups are directly attached to an aromatic ring, component C)(a)(ii), can be prepared by a typical acid base reaction, followed by the distillation of water, methanol, etc. However, the base must be stronger than the anion of the hydroxyl group of the aromatic compound. For example, lithium phenoxide can be prepared by reacting phenol with lithium hydroxide or lithium methoxide.

Suitable carboxylic acids for the preparation of the lithium salts C)(a)(i) include, for example, those aliphatic carboxylic acids having from about 1 to about 36 carbon atoms, and aromatic carboxylic acids wherein the aromatic ring system has from 6 to 18 carbon atoms. The aliphatic carboxylic acids may be either branched or straight chain, and either saturated or unsaturated. Both aliphatic and aromatic monocarboxylic acids and dicarboxylic acids are suitable. Some examples of these include formic acid, acetic acid, propionic acid, stearic acid, lactic acid, benzoic acid, salicylic acid, lauric acid, glutaric acid, p-hydroxybenzoic acid, phthalic acid, isophthalic acid, and terephthalic acid. Theoretically, any compound having the carboxylic acid group would be suitable provided any additional substituents do not interfere with the formation of the salt.

Hydroxyl group containing compounds having at least one hydroxyl group attached directly to an aromatic ring which are suitable for the preparation of lithium salts C)(a)(ii) include, for example, those aromatic alcohols containing from about 6 to 18 carbon atoms, and containing from 1 to 3 hydroxyl groups present per aromatic ring. Examples of these aromatic compounds include phenol, m-cresol, resorcinol, hydroquinone, catechol, 1-naphthol, 2-naphthol, 4-methoxy-1-naphthol, 1-methoxy-2-naphthol, 1-nitro-2-naphthol, 4-nitro-1-naphthol, 4-chloro-1-naphthol, 1-chloro-2-naphthol, hydroxyanthracene, hydroxyphenanthrene, isomeric methoxyphenols, nitrophenols, chlorophenols, etc.

According to the preferred embodiment of allophanate-trimer catalyst systems in the present invention, these lithium compounds which act as trimerization catalysts C)(a) are to be used in conjunction with C)(b) an allophanate catalyst.

Suitable allophanate catalysts, C)(b), for the present invention include metal carboxylates and metal acetylacetonates. Some examples of suitable allophanate catalysts for the present invention include zinc octoate, tin-2-ethylhexanoate, zinc acetyl-acetonate, zinc-2ethylhexanoate, cobalt linoresinate, lead naphthenate, lead 2-ethylhexanoate, lead linoresinate, cobalt 2-ethylhexanoate, cobalt naphthenate, etc. Preferred allophanate catalysts are zinc octoate, tin octoate, zinc-2-ethylhexanoate, tin-2-ethylhexanoate, and zinc acetylacetonate.

When using the preferred allophanate-trimer catalyst system in the present invention, the molar ratio of allophanate catalyst, C)(b), to lithium compound, C)(a), is from 20:1 to 1:20. Based on this, it is preferred to use between $1\times10^{-6}$ to $4\times10^{-5}$ mole of allophanate catalyst, C)(b), in conjunction with 0.015 to 0.2 equivalent hydroxyl groups from the organic compound which contains at least one hydroxyl group, i.e. component B), per equivalent of isocyanate of A) the toluene diisocyanate present to be trimerized. It is most preferred to use from about $5\times10^{-6}$ to $3.2\times10^{-5}$ mole of allophanate catalyst, C)(b), with the appropriate amount of lithium compound, C)(a), as described above, and from about 0.015 to about 0.2, preferably about 0.05 to about 0.15 equivalent hydroxyl group of the organic compound containing at least one hydroxyl group B), per equivalent of isocyanate of the TDI to be trimerized.

Suitable catalyst stoppers for use in the processes of the present invention include, for example, acidic catalyst stoppers such as, for example, anhydrous hydrochloric acid, sulfuric acid, bis(2-ethylhexyl) hydrogen phosphate, benzoyl chloride, Lewis Acids and the like. Preferred catalyst stoppers are benzoyl chloride and bis(2-ethylhexyl) hydrogen phosphate.

As used herein, the term "freeze-stable" refers to a liquid product in which solids do not precipitate or settle out of the liquid when stored at 25° C. for 4 weeks or longer. Some products which are "freeze-stable" may contain fine solids. However, these fine solids do not settle out of the product under the specified conditions.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all parts are parts by weight.

EXAMPLES

The following materials were used in the working examples:

TDI: an isomeric mixture having an NCO content of about 48.27%, and comprising 80% by weight 2,4-toluene diisocyanate and 20% by weight of 2,6-toluene diisocyanate.

ISO-1: an isomeric mixture having an NCO content of about 33.6%, and comprising 98% by weight of 4,4'-diphenylmethane diisocyanate and 2% by weight of 2,4'-diphenylmethane diisocyanate.

ISO-2: an isomeric mixture having an NCO content of about 33.6%, and comprising about 47% by weight of 4,4'-diphenylmethane diisocyanate, about 52% by weight of 2,4'-diphenylmethane diisocyanate and about 1% by weight 2,2'-diphenylmethane diisocyanate.

ISO-3: a polyisocyanate having an NCO content of about 31.5% and a functionality of about 2.7, and comprising 44% by weight of methylene diphenyl diisocyanate (which consists of about 42% of the 4,4'-isomer and 2% of the 2,4'-isomer) and 56% by weight of higher homologs of methylene diphenyl diisocyanate.

ISO-4: a polyisocyanate having an NCO content of about 32.2% and a functionality of about 2.4, and comprising 64% by weight of methylene diphenyl diisocyanate (which consists of about 45% of the 4,4'-isomer, about 17% of the 2,4'-isomer and about 2% of the 2,2'-isomer) and 36% by weight of higher homologs of methylene diphenyl diisocyanate.

Alcohol A: 1-Butanol

Alcohol B: 2-Ethyl-1-hexanol

Catalyst A: Tin-2-ethylhexanoate

Catalyst B: Lithium salicylate

Catalyst C: Methylene-bis (3,3',5,5'-tetra-dimethylaminomethyl-2,2'-phenol)

Polyol A: a propylene glycol/propylene oxide/ethylene oxide adduct having 20% terminal ethylene oxide, a functionality of 2 and an OH number of 28 (molecular weight=4000).

Polyol B: a propylene glycol/propylene oxide adduct having a functionality of about 2 and an OH number of 56 (molecular weight=2000).

Polyol C: a polyether polyol having an OH number of 56 (molecular weight=2885) and a functionality of about 2.86, and being prepared from glycerine/propylene glycol and propylene oxide (30% by wt.), followed by a mixture of propylene oxide/ethylene oxide (10% and 40% by wt., respectively), and terminated with 20% by wt. propylene oxide.

Polyol D: a glycerine/propylene oxide/ethylene oxide adduct having a 17.5% terminal ethylene oxide, a functionality of about 3 and an OH number of 28 (molecular weight=6000).

Polyol E: a propylene glycol/propylene oxide adduct having a functionality of about 2 and an OH number of 112 (molecular weight=1000).

Examples 1–8 demonstrate the preparation of freeze stable allophanate trimers using various OH compounds.

Example 1

To a 500 ml 3-neck flask, equipped with a stirrer, thermometer and gas bubble tube, were added 341 parts TDI and 68.2 parts Polyol C. The reaction mixture was heated to 90° C. over about 15 minutes with nitrogen gas being bubbled through the solution. Once the temperature of the mixture reached 90° C., 0.023 part Catalyst A and 0.004 part Catalyst B were added. After about 10 minutes at 90° C., 0.04 part benzoyl chloride was added to the reaction mixture followed by cooling to 25° C. The clear, colorless liquid had an NCO content of 26.8% (38.9% NCO theory allophanate). After storage at 25° C. for 14 weeks, the product remained a clear liquid.

Example 2

Using the same procedure as in Example 1, 371 parts TDI and 37.1 parts Polyol E were reacted at 90° C. with 0.024 part Catalyst A and 0.004 part Catalyst B. After 90 minutes at 90° C., 0.04 part benzoyl chloride was added and the reaction mixture cooled to 25° C. The clear, colorless liquid had an NCO content of 39.3% (42.4% NCO theory allophanate). After storage at 25° C. for 8 weeks, the product remained a clear liquid.

Example 3

Using the same procedure as in Example 1, 430 parts TDI and 32.7 parts Alcohol A were reacted at 90° C. with 0.025 part Catalyst A and 0.004 part Catalyst B. After 75 minutes at 90° C., 0.07 part benzoyl chloride was added and the reaction mixture cooled to 25° C. The clear, colorless liquid had an NCO content of 29.5% (36.9% NCO theory allophanate) and a viscosity at 25° C. of 3280 mPa·s. After storage at 25° C. for 15 weeks, the product remained a clear liquid.

Example 4

Using the same procedure, materials and their respective quantities as in Example 3, except 37 parts Alcohol A was used to give a clear, colorless liquid having an NCO content of 29.4% (35.5% NCO theory allophanate) and a viscosity at 25° C. of 1760 mPa·s. After storage at 25° C. for 15 weeks, the product remained a clear liquid.

Example 5

Using the same procedure, materials and their respective quantities as in Example 3, except 28.4 parts Alcohol A was used to give a clear colorless liquid having an NCO content of 30.6% (38.3% NCO theory allophanate) and a viscosity at 25° C. of 1510 mPa·s. After storage at 25° C. for 10 weeks, the product remained a clear liquid.

Example 6

Using the same procedure as in Example 3, 430 parts TDI and 48.1 parts Alcohol B were reacted at 90° C. with 0.025 part Catalyst A and 0.004 part Catalyst B. After 75 minutes at 90° C., 0.07 part benzoyl chloride was added and the reaction mixture cooled to 25° C. The clear, colorless liquid had an NCO content of 28.0% (36.9% NCO theory allophanate) and a viscosity at 25° C. of 7140 mPa·s. After storage at 25° C. for 12 weeks, the product remained a clear liquid.

Example 7

Using the same procedure, materials and their respective quantities as in Example 6, except 55.9 parts Alcohol B was used to give a clear, colorless liquid having an NCO content of 26.5% (35.3% NCO theory allophanate) and a viscosity at 25° C. of 14,620 Pa·s. After storage at 25° C. for 12 weeks, the product remained a clear liquid.

Example 8

Using the same procedure, materials and their respective quantities as in Example 6, except 63.6 parts Alcohol B was used to give a clear, colorless liquid having an NCO content of 25.5% (33.7% NCO theory allophanate) and a viscosity at 25° C. of 8240 mPa·s. After storage at 25° C. for 24 weeks, the product remained a clear liquid.

Examples 9–12 demonstrate preparation of freeze stable urethane prepolymers of allophanate/trimer using polyethers.

Example 9

To a 500 ml 3-neck flask equipped with a stirrer and thermometer, were added 174 parts of the product of Example 3 and 26 parts Polyol B. The mixture was heated to 60° C. over about 15 minutes and then held at 60° C. for 2 hours followed by cooling to 25° C. The clear liquid had an NCO content of 25.1% and a viscosity at 25° C. of 4770 mPa·s. After storage at 25° C. for 15 weeks, the product remained a clear liquid.

Example 10

Using the same procedure of Example 9, 174 parts of the product of Example 4 and 26 parts of Polyol B were reacted at 60° C. to give a clear liquid product having an NCO content of 25.0% and a viscosity at 25° C. of 2810 mPa·s. After storage at 25° C. for 15 weeks, the product remained a clear liquid.

Example 11

Using the same procedure of Example 9, 174 parts of the product of Example 4 and 26 parts of Polyol A were reacted at 60° to give a clear liquid product having an NCO content of 25.1% and a viscosity at 25° C. of 2380 mPa·s. After storage at 25° C. for 15 weeks, the product remained a clear liquid.

Example 12

Using the same procedure of Example 9, 174 parts of the product of Example 4 and 26 parts of Polyol D were reacted at 60° C. to give a clear liquid product having an NCO content of 25.3% and a viscosity at 25° C. of 2600 mPa·s. After storage at 25° C. for 15 weeks, the product remained a clear liquid.

Examples 13–24 demonstrate how allophanate trimers of TDI, that are not freeze-stable, can be made freeze-stable by blending with 5 to 50% by weight of an MDI based isocyanate.

Example 13 a): Using the same procedure as in Example 1, 371 parts TDI and 17.4 parts Alcohol B were reacted at 100° C. with 0.01 part Catalyst A and 0.01 part Catalyst B. After 4.5 hours at 100° C., 0.04 part benzoyl chloride was added and the reaction mixture cooled to 25° C. The clear, colorless liquid had an NCO content of 31.0% (43.2% NCO theory allophanate) and a viscosity at 25° C. of 18,750 mPa·s. After storage at 25° C. for 4 days, solids formed and precipitated out of the allophanate/trimer.

b): A second sample was made consisting of 70 parts of the above allophanate/trimer and 30 parts of ISO-4. After storage at 25° C. for 14 weeks, the product remained a clear liquid. This product had a viscosity (before storage) at 25° C. of 1550 mPa·s.

Example 14 a): Using the same procedure, materials and their respective quantities as in Example 13a), except 21.1 parts Alcohol B was used to give a clear, colorless liquid having an NCO content of 30.1% (42.2% NCO theory allophanate) and a viscosity at 25° C. of 21,700 mPa·s. After storage at 25° C. for 4 days, solids formed and precipitated out of the allophanate/trimer product.

b) and c): Two additional samples were made by blending 70 parts of the above allophanate/trimer with 30 parts of ISO-3 in b), and 30 parts of ISO-1 in c) to give clear liquid products having viscosities at 25° C. of 3900 mPa·s and 520 mPa·s, respectively. Both blended samples, stored at 25° C., were still clear liquids after 14 weeks.

Example 15 a): Using the same procedure, materials and their respective quantities as in Example 13a), except 28.6 parts Alcohol B was used and the reaction time was only 75 minutes, a clear, colorless liquid resulted having an NCO content of 30.5% (40.2% NCO theory allophanate) and a viscosity at 25° C. of 3780 mPa·s. After storage at 25° C. for 5 days, solids formed and precipitated out of the allophanate/trimer product.

b) and c): Two additional samples were made by blending 80 parts of the above allophanate/trimer with 20 parts of ISO-1 in b), and 20 parts of ISO-2 in c) to give clear liquid products having viscosities at 25° C. of 544 mPa·s and 530 mPa·s, respectively. Both blended samples, stored at 25° C., were still clear liquids after 21 weeks.

Example 16 a): Using the same procedure, materials and their respective quantities as in Example 15a, except 35.2 parts Alcohol B was used to give a clear, colorless liquid having an NCO content of 30.1% (38.5% NCO theory allophanate) and a viscosity at 25° C. of 1480 mPa·s. After storage at 25° C. for 10 days, solids formed and precipitated out of the allophanate/trimer product.

b) and c): Two additional samples were made by blending 80 parts of the above allophanate/trimer with 20 parts ISO-1 in b), and 20 parts of ISO-2 in c) to give clear, liquid products having viscosities at 25° C. of 335 and 342 mPa·s, respectively. Both blended samples stored at 25° C. were still clear liquids after 21 weeks.

Example 17 a): Using the same procedure, materials and their respective quantities in Example 16a, a clear, colorless liquid was prepared having an NCO content of 27.8% (38.5% NCO theory allophanate) and a viscosity at 25° C. of 28,300 mPa·s. After storage at 25° C. for 10 weeks, solids formed in the allophanate/trimer product.

b) and c): Two additional samples were made by blending 90 parts of the above allophanate/trimer with 10 parts ISO-1 in b), and 10 parts ISO-3 in c) to give clear liquid products. Both blended samples, stored at 25° C., were still clear liquids after 19 weeks.

This example, and Examples 21 and 22, shows how a stable allophanate/trimer, which is freeze-stable with no solid formation for over 4 weeks, can be improved by blending with an MDI based isocyanate.

Example 18 a): Using the same procedure, materials and their respective quantities as in Example 3, except 14.6 parts Alcohol A was used to give a clear, colorless liquid having an NCO content of 30.2% (43.0% NCO theory allophanate) and a viscosity at 25° C. of 73,000 mPa·s. After storage at 25° C. for 15 days, solids formed and precipitated out of the allophanate/trimer product.

b): A second sample, made up of 80 parts of the above allophanate/trimer and 20 parts of ISO-4, was still a clear liquid at 25° C. after 15 weeks. This material had a viscosity at 25° C. of 7900 mPa·s.

Example 19 a): Using the same procedure as in Example 3, 419 parts TDI and 18.4 parts Alcohol A were reacted at 100° C. for 2 hours with 0.066 part Catalyst A and 0.022 part Catalyst B. The reaction was stopped by the addition of 0.16 part benzoyl chloride, then cooled to 25° C. The clear, colorless liquid had an NCO content of 29.6% (41.5% NCO theory allophanate) and a viscosity at 25° C. of 16,350 mPa·s. After storage at 25° C. for 8 days, solids formed and precipitated out of the allophanate/trimer product.

b): A second sample made up of 80 parts of the above allophanate/trimer and 20 parts of ISO-3 was still a clear liquid at 25° C. after 25 weeks. This material had a viscosity at 25° C. of 5150 mPa·s.

Example 20 a): Using the same procedure as in Example 3, 581 parts TDI and 25.5 parts Alcohol A were reacted at 100° C. for 45 minutes with 0.025 part Catalyst A and 0.026 part Catalyst B. The reaction was stopped by the addition of 0.06 part benzoyl chloride, then cooled to 25° C. The clear, colorless liquid had an NCO content of 33.9% (41.5% NCO theory allophanate) and a viscosity at 25° C. of 300 mPa·s. After storage at 25° C. for 4 days, solids formed and precipitated out of the allophanate/trimer product. b) and c): Two additional samples were made by blending 70 parts of the above allophanate/trimer with 30 parts ISO-1 in b), and 30 parts ISO-3 in c) to give clear liquid products. Both blended samples, stored at 25° C., were still clear liquids after 18 weeks. The two blended products had a viscosity at 25° C. of 72 and 260 mPa·s, respectively.

Example 21 a): Using the same procedure as in Example 3, 566 parts TDI and 37.3 parts Alcohol A were reacted at 100° C. for 35 minutes with 0.015 part Catalyst A and 0.015 part Catalyst B. The reaction was stopped by the addition of 0.05 part benzoyl chloride then cooled to 25° C. The clear, colorless liquid had an NCO content of 28.2% (38.3% NCO theory allophanate) and a viscosity at 25° C. of 26,850 mPa·s. After storage at 25° C. for 36 days, solids formed in the allophanate/trimer product.

b): A second sample, made up of 90 parts of the above allophanate/trimer and 10 parts of ISO-1, was still a clear liquid at 25° C. after 18 weeks. This material had a viscosity at 25° C. of 5960 mPa·s.

Example 22 a): Using the same procedure as in Example 3, 581 parts TDI and 38.3 parts Alcohol A were reacted at 100° C. for 37 minutes with 0.015 part Catalyst A and 0.030 part Catalyst B LiSal. The reaction was stopped by the addition of 0.05 part benzoyl chloride, then cooled to 25° C. The clear, colorless liquid had an NCO content of 29.5% (38.3% NCO theory allophanate) and a viscosity at 25° C. of 10,600 mPa·s. After storage at 25° C. for 50 days, solids formed in the allophanate/trimer product.

b) and c): Two additional samples were made by blending 90 parts of the above allophanate/trimer with 10 parts ISO-1 in b) and 10 parts ISO-3 in c) to give clear liquid products. Both blended samples, stored at 25° C., were still clear liquids after 16 weeks. The two blended products had a viscosity at 25° C. of 3390 and 6300 mPa·s, respectively.

Example 23 a): Using the same procedure as in Example 3, 364 parts TDI and 24 parts Alcohol A were reacted at 90° C. for 32 minutes with 0.01 part Catalyst A and 0.01 part Catalyst B. The reaction was stopped by the addition of 0.04 part benzoyl chloride, then cooled to 25° C. The clear, colorless liquid had an NCO content of 32.3% (38.3% NCO theory allophanate) and a viscosity at 25° C. of 285 mPa·s. After storage at 25° C. for 16 days, solids formed and precipitated out of the allophanate/trimer product.

b): A second sample made up of 80 parts of the above allophanate/trimer and 20 parts ISO-4 was still a clear liquid at 25° C. after 11 weeks. This material had a viscosity at 25° C. of 121 mPa·s.

Example 24 a): Using the same procedure as in Example 1, 510 parts TDI and 48.4 parts Alcohol B were reacted at 100° C. with 0.20 part Catalyst C. After 2.5 hours at 100° C., 0.48 part benzoyl chloride was added and the reaction mixture cooled to 25° C. The clear, colorless liquid had an NCO content of 29.7% (38.5% NCO theory allophanate) and a viscosity at 25° C. of 2724 mPa·s. After storage at 25° C. for 5 days, solids formed and precipitated out of the allophanate/trimer product.

b) and c): Two additional samples were made by blending 70 parts of the above allophanate/trimer with 30 parts ISO-1 in b), and 30 parts of ISO-3 in c) to give clear liquid products. Both blended samples, stored at 25° C., were still clear liquids after 18 weeks. The two blended products had a viscosity at 25° C. of 216 and 1160 mPa·s, respectively.

Example 25 a): Using the same procedure as in Example 1, 1098 parts TDI was reacted at 94° C. with 0.13 part Catalyst C. After 3.75 hours at 94° C., 0.24 part benzoyl chloride was added and the reaction mixture cooled to 25° C. The clear, colorless liquid had an NCO content of 40.2%.

b), c), d) and e): Four additional samples were made by blending 70 parts of the above trimer modified TDI with 30 parts of ISO-1, ISO-2, ISO-3 and ISO-4, in b), c), d) and e), respectively. All five samples had between 15–30% by weight solids after being stored at 25° C. for 18 hours. The solids precipitated out of these products.

Example 26 a): Using the same procedure as in Example 1, 1051 parts TDI was reacted at 94° with 0.20 part Catalyst C. After 2.5 hours at 94° C., 0.5 part benzoyl chloride was added and the reaction mixture cooled to 25° C. The clear, colorless liquid had an NCO content of 35.3%.

b), c), d) and e): Four additional samples were made by blending 70 parts of the above trimer modified TDI with 30 parts of ISO-1, ISO-2, ISO-3, and ISO-4, in b), c), d) and e), respectively. All five samples had between 30 to 100% by weight solids after being stored at 25° C. for 18 hours. The solids precipitated out of these products.

Comparing Examples 24 and 25 shows how the presence of allophanate prevents formation of solids for blend of a trimer modified TDI with a polyisocyanate of the MDI series. Example 25a contains 32% by weight trimer and 68% by weight TDI monomer, while Example 24a contains 32% by weight trimer, 32% by weight allophanate and 36% by weight TDI monomer. When both products are blended with either ISO-1 or ISO-3, only the allophanate containing trimer product is freeze stable.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A freeze-stable urethane prepolymer of an allophanate-modified, partially modified toluene diisocyanate or polyisocyanate having an NCO group content of from about 14 to 40%, and comprising the reaction product of:

(I) a freeze-stable allophanate-modified, partially trimerized toluene diisocyanate or polyisocyanate having an NCO group content of from 15 to 42% and comprising the reaction product of:

A) toluene diisocyanate
and
B) an organic compound containing at least one hydroxyl group,
in the presence of a catalytic amount of C) at least one allophanate-trimer catalyst or an allophanate-trimer catalysts system;

wherein component B) is present in a quantity such that there are from about 0.015 to about 0.2 equivalent hydroxyl groups per equivalent of isocyanate of the TDI present, at least about 50% of the urethane groups are converted to allophanate groups by C) said catalyst or catalyst system, and a catalyst stopper is added once the desired NCO group content is attained;

and (III) an isocyanate-reactive component containing from about 1.5 to about 4 hydroxyl groups and having a molecular weight of from about 76 to about 10,000.

2. The freeze-stable urethane prepolymer of an allophanate-modified, partially trimerized toluene diisocyanate or polyisocyanate of claim 1, wherein the NCO group content is from about 20 to about 35%.

3. The freeze-stable urethane prepolymer of an allophanate-modified, partially trimerized toluene diisocyanate or polyisocyanate of claim 1, wherein (III) is selected from the group consisting of (a) a polyether polyol having a molecular weight of from about 100 to about 10,000 and a hydroxyl functionality of from about 1.5 to about 4 and (b) a polyester polyol having a molecular weight of from about 200 to about 3,000 and a hydroxyl functionallity of from about 1.8 to about 3.

4. A freeze-stable blend of isocyanates comprising:
(A) the urethane prepolymer of an allophanate-modified, partially trimerized toluene diisocyanate or polyisocyanate of claim 1,
and
(B) a polyisocyanate comprising:
(1) from 0 to 60% by weight of 2,4'-diphenylmethane diisocyanate,
(2) no more than 6% by weight of 2,2'-diphenylmethane diisocyanate,
(3) from 30 to 100% by weight of 4,4'-diphenylmethane diisocyanate,
and
(4) from 0 to 60% by weight of higher functional isocyanates of the diphenylmethane series,
with the %'s by weight of (B)(1), (B)(2), (B)(3) and (B)(4) totaling 100% by weight.

5. A freeze-stable urethane prepolymer of an allophanate-modified, partially trimerized toluene diisocyanate or polyisocyanate having an NCO group content of from about 14 to about 40%, and comprising the reaction product of:
(I) a freeze-stable blend of isocyanates having an NCO group content of from about 16.8 to about 41.6% comprising:
(1) 50 to 95% by weight, based on 100% by weight of (1) and (2), of an allophanate-modified, partially trimerized toluene diisocyanate or polyisocyanate which comprises the reaction product of A) toluene diisocyanate and B) an organic compound containing at least one hydroxyl group, in the presence of a catalytic amount of C) at least one allophanate-trimer catalyst or an allophanate-trimer catalyst system; wherein B) is present in a sufficient amount such that there are from about 0.015 to 0.2 equivalent hydroxyl groups per equivalent of isocyanate group of the toluene diisocyanate present, and at least about 50% of the urethane groups are converted to allophanate groups by the catalyst or the catalyst system; and (2) 5 to 50% by weight, based on 100% by weight of (1) and (2), of a polyisocyanate comprising:
(a) from 0 to 60% by weight of 2,4'-diphenylmethane diisocyanate,
(b) no more than 6% by weight of 2,2'-diphenylmethane diisocyanate,
(c) from 30 to 100% by weight of 4,4'-diphenylmethane diisocyanate,
and
(d) from 0 to 60% by weight of higher functional isocyanates of the diphenylmethane series,
with the %'s by weight of (2)(a), (2)(b), (2)(c) and (2)(d) totaling 100% by weight;
and
(III) an isocyanate-reactive component containing from about 1.5 to about 4 hydroxyl groups and having a molecular weight of from about 76 to about 10,000.

6. The freeze-stable urethane prepolymer of an allophanate-modified, partially trimerized toluene diisocyanate or polyisocyanate of claim 5, wherein the NCO group content is from about 20 to 35%.

7. The freeze-stable urethane prepolymer of an allophanate-modified, partially trimerized toluene diisocyanate or polyisocyanate of claim 5, wherein (III) is selected from the group consisting of (a) a polyether polyol having a molecular weight of from about 100 to about 10,000 and a hydroxyl functionality of from about 1.5 to about 4 and (B) a polyester polyol having a molecular weight of from about 200 to about 3,000 and a hydroxyl functionality of from about 1.8 to about 3.

8. A process for the preparation of a freeze-stable urethane prepolymer of an allophanate-modified, partially trimerized toluene diisocyanate or polyisocyanate, comprising:
1) reacting (I) a freeze-stable allophanate-modified, partially trimerized toluene diisocyanate or polyisocyanate having an NCO group content of from about 15 to about 42%, comprising:
a) heating A) toluene diisocyanate and B) at least one organic compound which contains at least one hydroxyl group to a temperature of from about 50 to about 200° C. for a time period of from about 1 to about 500 minutes, in the presence of C) at least one allophanate-trimer catalyst or an allophanate-trimer catalyst system; wherein component B) is present in a quantity such that there are from about 0.015 to about 0.20 equivalent hydroxyl groups per equivalent of isocyanate of the toluene diisocyanate present and at least about 50% of the urethane groups are converted to allophanate groups by the catalyst or the catalyst system;
and
b) adding a catalyst stopper, once the desired NCO group content of the reaction mixture in a) is reached, to neutralize the catalyst in the reaction mixture;
with (III) an isocyanate-reactive component containing from about 1.5 to about 4 hydroxyl groups and having a molecular weight of from about 76 to about 10,000, at temperatures between about 40 and about 120° C. for a time period of from about 0.5 to 4 hours.

9. The process of claim 8, wherein the NCO group content is from about 20 to about 35%.

10. The process of claim 8, wherein (III) is selected from the group consisting of (a) a polyether polyol having a molecular weight of from about 100 to about 10,000 and a hydroxyl functionality of from about 1.5 to about 4 and (b)

a polyester polyol having a molecular weight of from about 200 to about 3,000 and a hydroxyl functionality of from about 1.8 about 3.

11. A process for the preparation of a freeze-stable urethane prepolymer of a blend of an allophanate-modified, partially trimerized toluene diisocyanate or polyisocyanate, comprising:

1) reacting (I) a freeze-stable blend of polyisocyanates having an NCO group content of from about 16.8 to about 41.6%, comprising
   a) heating A) toluene diisocyanate and B) at least one organic compound which contains at least one hydroxyl group to a temperature of from about 50 to about 200° C. for a time period of from about 1 to about 500 minutes, in the presence of C) at least one allophanate-trimer catalyst or an allophanate-trimer catalyst system, wherein component B) is present in a quantity such that there are from about 0.015 to about 0.2 equivalent hydroxyl groups per equivalent of isocyanate of the toluene diisocyanate present and at least about 50% of the urethane groups are converted to allophanate groups by the catalyst of the catalyst system, thereby forming an allophanate-modified, partially trimerized toluene diisocyanate or polyisocyanate; and
   b) blending, at a temperature of from 20 to 120° C., the reaction mixture from step a), with
   (II) a polymethylene poly(phenylisocyanate) comprising:
      (a) from 0 to 60% by weight of 2,4'-diphenylmethane diisocyanate,
      (b) no more than 6% by weight of 2,2'-diphenylmethane diisocyanate,
      (c) from 30 to 100% by weight of 4,4'-diphenylmethane diisocyanate,
      and
      (d) from 0 to 60% by weight of higher functional isocyanates of the diphenylmethane series,
      with the %'s by weight of (II)(a), (II)(b), (II)(c) and (II)(d) totaling 100% by weight;
   with (III) an isocyanate-reactive component containing from about 1.5 to about 4 hydroxyl groups and having a molecular weight of from about 76 to about 10,000, at temperatures between about 40 and about 120° C. for a time period of from about 0.5 to about 4 hours.

12. The process of claim 11, wherein a catalyst stopper is added to the reaction mixture from step 1)a) once the desired NCO group content is reacted, before blending with (II).

13. The process of claim 11, wherein the NCO group content is from about 20 to about 35%.

14. The process of claim 11, wherein (III) is selected from the group consisting of (a) a polyether polyol having a molecular weight of from about 100 to about 10,000 and a hydroxyl functionality of from about 1.5 to about 4 and (b) a polyester polyol having a molecular weight of from about 200 to about 3,000 and a hydroxyl functionality of from about 1.8 to about 3.

* * * * *